(12) United States Patent
Ihm et al.

(10) Patent No.: US 7,860,077 B2
(45) Date of Patent: Dec. 28, 2010

(54) METHOD OF TRANSMITTING FEEDBACK INFORMATION IN AN ORTHOGONAL FREQUENCY DIVISION MULTIPLEXING (OFDM)/OFDM ACCESS (OFDMA) MOBILE COMMUNICATION SYSTEM

(75) Inventors: Bin Chul Ihm, Anyang-si (KR); Jin Young Chun, Seoul (KR); Yong Suk Jin, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/622,358

(22) Filed: Nov. 19, 2009

(65) Prior Publication Data

US 2010/0067475 A1 Mar. 18, 2010

Related U.S. Application Data

(63) Continuation of application No. 11/253,354, filed on Oct. 18, 2005, now Pat. No. 7,684,762.

(30) Foreign Application Priority Data

| Oct. 18, 2004 | (KR) | 10-2004-0083048 |
| Nov. 3, 2004 | (KR) | 10-2004-0089029 |
| Dec. 27, 2004 | (KR) | 10-2004-0112927 |
| Jan. 5, 2005 | (KR) | 10-2005-0000930 |

(51) Int. Cl.
*H04J 3/24* (2006.01)

(52) U.S. Cl. ................ 370/348; 370/329; 370/349; 455/450

(58) Field of Classification Search ............. 370/329, 370/338, 348, 349, 468; 455/69, 522, 450–452.2
See application file for complete search history.

(56) References Cited

U.S. PATENT DOCUMENTS 6,058,106 A 5/2000 Cudak et al.

(Continued)

FOREIGN PATENT DOCUMENTS

JP 2003-078480 3/2003

(Continued)

OTHER PUBLICATIONS

Balachandran, K. el al., "Medium Access Control and Radio Resource Management for Packet Data Services Over IS-136 Channels"; Proceedings of the 49th Annual IEEE Vehicular Technology Conference; May 16, 1999; pp. 133-139.

(Continued)

*Primary Examiner*—Sharad Rampuria
(74) *Attorney, Agent, or Firm*—Lee, Hong, Degerman, Kang & Waimey

(57) ABSTRACT

A method of transmitting feedback information in a wireless communication system is disclosed. More specifically, the method comprises a mobile station (MS) which determines whether to transmit feedback information to a base station (BS) without solicitation from the BS. After determining to do so, the MS transmits a request message to request the BS to allocate an uplink resource for transmitting at least one unsolicited header and thereafter receives the uplink resource allocation from the BS. Lastly, the MS transmits the at least one unsolicited header via the allocated uplink resource.

7 Claims, 11 Drawing Sheets

U.S. PATENT DOCUMENTS

| | | | |
|---|---|---|---|
| 6,097,961 A | 8/2000 | Alanara et al. | |
| 6,594,251 B1 | 7/2003 | Raissinia et al. | |
| 6,615,382 B1 | 9/2003 | Kang et al. | |
| 7,046,651 B2 | 5/2006 | Terry | |
| 7,304,975 B2 | 12/2007 | Shvodian | |
| 7,339,921 B2* | 3/2008 | Kim et al. | 370/349 |
| 7,450,909 B2 | 11/2008 | Cho et al. | |
| 7,542,442 B2 | 6/2009 | Lee et al. | |
| 7,558,535 B2* | 7/2009 | Cho et al. | 455/69 |
| 7,630,391 B2* | 12/2009 | Jin et al. | 370/431 |
| 7,668,143 B2 | 2/2010 | Nagata et al. | |
| 7,676,230 B2* | 3/2010 | Kang et al. | 455/450 |
| 7,724,706 B2* | 5/2010 | Kang et al. | 370/331 |
| 2002/0038385 A1 | 3/2002 | Kalliokulju | |
| 2002/0163932 A1 | 11/2002 | Fischer et al. | |
| 2004/0082356 A1 | 4/2004 | Walton et al. | |
| 2004/0166886 A1 | 8/2004 | Laroia et al. | |
| 2005/0186933 A1 | 8/2005 | Trans | |
| 2005/0286451 A1 | 12/2005 | Kim et al. | |
| 2006/0039319 A1 | 2/2006 | Lee et al. | |
| 2006/0062192 A1 | 3/2006 | Payne, III | |
| 2006/0109923 A1* | 5/2006 | Cai et al. | 375/260 |
| 2006/0250963 A1 | 11/2006 | Jin et al. | |
| 2007/0097945 A1* | 5/2007 | Wang et al. | 370/349 |
| 2007/0287449 A1 | 12/2007 | Ju et al. | |
| 2008/0056273 A1* | 3/2008 | Pelletier et al. | 370/395.21 |
| 2008/0069031 A1* | 3/2008 | Zhang et al. | 370/328 |
| 2009/0059858 A1* | 3/2009 | Lee et al. | 370/329 |
| 2009/0080351 A1* | 3/2009 | Ryu et al. | 370/312 |
| 2009/0168770 A1* | 7/2009 | Mohanty | 370/389 |
| 2009/0303918 A1* | 12/2009 | Ma et al. | 370/315 |
| 2010/0027457 A1 | 2/2010 | Okuda | |
| 2010/0177693 A1 | 7/2010 | Ryu et al. | |
| 2010/0208655 A1 | 8/2010 | Kim et al. | |

FOREIGN PATENT DOCUMENTS

| | | |
|---|---|---|
| KR | 10-2004-0046322 | 6/2004 |
| KR | 1020040088113 | 10/2004 |
| KR | 10-2005-0020576 | 3/2005 |

OTHER PUBLICATIONS

IEEE Computer Society, et al.; "IEEE Standard for Local and Metropolitan Area Networks; Part 16: Air Interface for Fixed Broadband Wireless Access Systems"; Oct. 1, 2004; IEEE STD 802.16-2004.

Ori, Z., et al., "Generic Sleep Corrections," IEEE 802.16 Broadband Wireless Access Working Group Document, IEEE C802.16e-05/028; Jan. 24, 2005.

* cited by examiner

FIG. 9

| MAC Header | Fragmentation Sub-header | MAC SDU | EFAT Sub-header(FS) |

| MAC Header | Fragmentation Sub-header | MAC SDU | Feedback Sub-header(FS) |

METHOD OF TRANSMITTING FEEDBACK INFORMATION IN AN ORTHOGONAL FREQUENCY DIVISION MULTIPLEXING (OFDM)/OFDM ACCESS (OFDMA) MOBILE COMMUNICATION SYSTEM

CROSS-REFERENCE TO RELATED APPLICATIONS

This application is a continuation of U.S. application Ser. No. 11/253,354, filed Oct. 18, 2005, now issued as U.S. Pat. No. 7,684,762, which pursuant to 35 U.S.C. §119(a), claims the benefit of Korean Application No. P2004-83048, filed on Oct. 18, 2004, Korean Application No. P2004-89029, filed on Nov. 3, 2004, Korean Application No. P2004-112927, filed on Dec. 27, 2004, and Korean Application No. P2005-930, filed on Jan. 5, 2005, which are hereby incorporated by reference.

BACKGROUND OF THE INVENTION

1. Field of the Invention

The present invention relates to a method of transmitting feedback information, and more particularly, to a method of transmitting feedback information in an Orthogonal Frequency Division Multiplexing (OFDM)/OFDM Access (OFDMA) mobile communication system.

2. Discussion of the Related Art

In a multi-input, multi-output (MIMO) wireless communication system employing an Orthogonal Frequency Division Multiplexing (OFDM) method, feedback information is transmitted from a mobile station (MS) to a base station (BS). The OFDM method uses a plurality of subcarriers to increase the frequency usage rate. Here, the subcarriers maintain orthogonal relationships with each other.

In operation, the BS allocates a fast feedback channel in order to acquire downlink channel status information, and using the fast feedback channel, the BS transmits a Channel Quality Information Channel (CQICH) Information Element (IE) or put differently, a CQICH_enhanced_allocation IE. At the same time, the BS uses a subheader (or fast feedback_allocation subheader) to allocate the CQI channel.

In the MIMO system, the feedback information is transmitted via the allocated CQICH or the fast feedback channel. The feedback information includes the MIMO channel matrix H and the weight value, along with information pertaining to MS selected MIMO mode and MS selected permutation mode. Here, the MIMO mode includes a Space-Time Transmit Diversity (STTD) mode, a Spatial Multiplexing (SM) mode, and a closed loop SM mode, for example. Moreover, the permutation mode includes a Full Usage Subcarrier (FUSC), which uses all the subcarriers in the bandwidth to achieve diversity, a Partial Usage Subcarrier (PUSC), which uses a specified amount of subcarriers to achieve diversity, and an Adoptive Modulation Coding (AMC), which uses a specified amount of subcarriers adjacent to each other.

According to the related art, the MS transmits the feedback information according to the instruction provided from the BS. However, even if the MS desires to transmit feedback information to the BS, the MS has to wait until the BS transmits instruction to do so. As such, the transmission channel is not effectively or efficiently utilized.

SUMMARY OF THE INVENTION

Accordingly, the present invention is directed to a method of transmitting feedback information in OFDM/OFDMA mobile communication system that substantially obviates one or more problems due to limitations and disadvantages of the related art.

An object of the present invention is to provide a method of transmitting feedback information in a wireless communication system wherein a Channel Quality Indication Channel (CQICH) is allocated to a mobile station (MS) by a base station (BS).

Another object of the present invention is to provide a method of transmitting feedback information in a wireless communication system wherein a Channel Quality Indication Channel (CQICH) is not allocated to a mobile station (MS) by a base station (BS).

A further object of the present invention is to provide a method of receiving feedback information in a wireless communication system wherein a Channel Quality Indication Channel (CQICH) is allocated or is not allocated to a mobile station (MS) by a base station (BS).

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting feedback information includes a mobile station (MS) which determines whether to transmit feedback information to a base station (BS) without solicitation from the BS. After determining to do so, the MS transmits a request message to request the BS to allocate an uplink resource for transmitting at least one unsolicited header and thereafter receives the uplink resource allocation from the BS. Lastly, the MS transmits the at least one unsolicited header via the allocated uplink resource.

In another aspect of the present invention, a method of receiving feedback information includes a base station (BS) which receives a request message from a mobile station (MS) for an uplink resource allocation, wherein the request message is transmitted without solicitation from the BS. Furthermore, the BS determines the uplink resource to allocate to the MS for transmitting at least unsolicited header and then transmits the determined uplink resource allocation to the MS. Lastly, the BS receives the at least unsolicited header via the allocated uplink resource.

In another aspect of the present invention, a method of transmitting feedback information includes a mobile station (MS) which determines to transmit feedback information to a base station (BS) without solicitation from the BS and then based on the determination, transmits an indication flag to request for the uplink resource allocation. Thereafter, the MS receives the uplink resource allocation from the BS and in response, transmits at least one unsolicited header via the allocated uplink resource, wherein the at least one unsolicited header includes the feedback information.

In another embodiment of the present invention, a method of receiving feedback information includes a base station (BS) which receives an indication flag from the MS for an uplink resource allocation, wherein the indication flag is transmitted without solicitation from the BS. Furthermore, the BS determines the uplink resource to allocate to the MS for transmitting at least one unsolicited header and then transmits the determined uplink resource allocation to the MS.

Lastly, the BS receives the at least one header via the allocated uplink resource, wherein the unsolicited header includes the feedback information.

Yet, in another embodiment of the present invention, a method of transmitting feedback information includes a mobile station (MS) which first determines to transmit feedback information to a base station (BS) without solicitation from the BS, and then determines whether a Channel Quality Indication Channel (CQICH) is allocated by the BS. Furthermore, the MS transmits an indication flag to request the BS to allocate an uplink resource for transmitting at least one unsolicited header if the CQICH is allocated by the BS. Thereafter, the MS receives the uplink resource allocation from the BS and then transmits the at least one unsolicited header via the allocated uplink resource.

In another embodiment of the present invention, a method of transmitting feedback information includes a mobile station (MS) which determines first determines to transmit feedback information to a base station (BS) without solicitation from the BS, and then determines whether a Channel Quality Indication Channel (CQICH) is allocated by the BS. Thereafter, the MS transmits a request message to request the BS to allocate an uplink resource for transmitting at least one unsolicited header. Lastly, the MS receives the uplink resource allocation form the BS, and then transmits the at least one unsolicited header via the allocated uplink resource.

Yet in another embodiment of the present invention, a method of transmitting feedback information includes a mobile station (MS) which transmits data to a base station (BS) via an uplink resource. Thereafter, the MS determines to transmit feedback information to the BS without solicitation from the BS, and then transmits at least one unsolicited header via the uplink resource used to transmit the data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIG. 9 illustrates examples of a data structure of a MAC Protocol Data Unit (PDU);

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
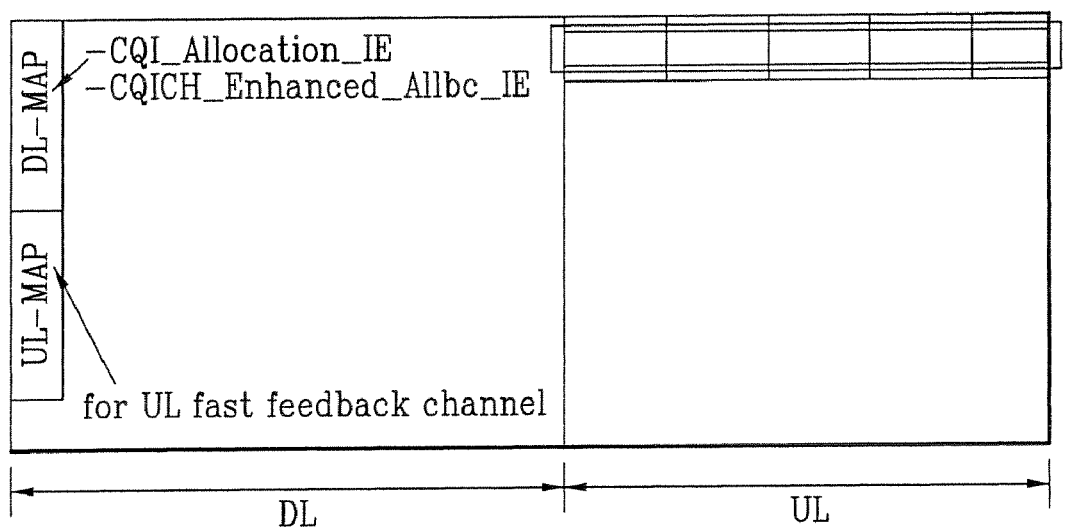
FIG. 1 illustrates an example of a data frame according to a fast feedback channel allocation.

FIG. 1 illustrates an example of a data frame according to a fast feedback channel allocation. As shown in FIG. 1, the BS transmits fast feedback channel location information to each MS via an Uplink Map (UL-MAP). The MS receives the fast feedback channel location information, and then uses the fast feedback channel to transmit feedback information. The BS then notifies an allocation the fast feedback channel location, a transmission period by which the MS has to transmit feedback information, and feedback type information by using the CQICH_enhanced_allocation_IE. The BS then receives the feedback information according to the designated feedback type transmitted from the MS after receiving the fast feedback channel location allocation and the transmission period by which to transmit the information.

Alternatively, the BS can use a fast feedback subheader to receive the feedback information from the MS. Here, the BS can use the fast feedback subheader to allocate the fast feedback channel location.

The feedback type, as stated above, signifies which feedback information has been transmitted. In other words, the feedback information relates to a Signal-to-Noise Ratio (SNR) of the downlink channel status, the weight value in case of the MIMO system, and which information between the MIMO mode or the permutation mode was transmitted.

Figure 2:
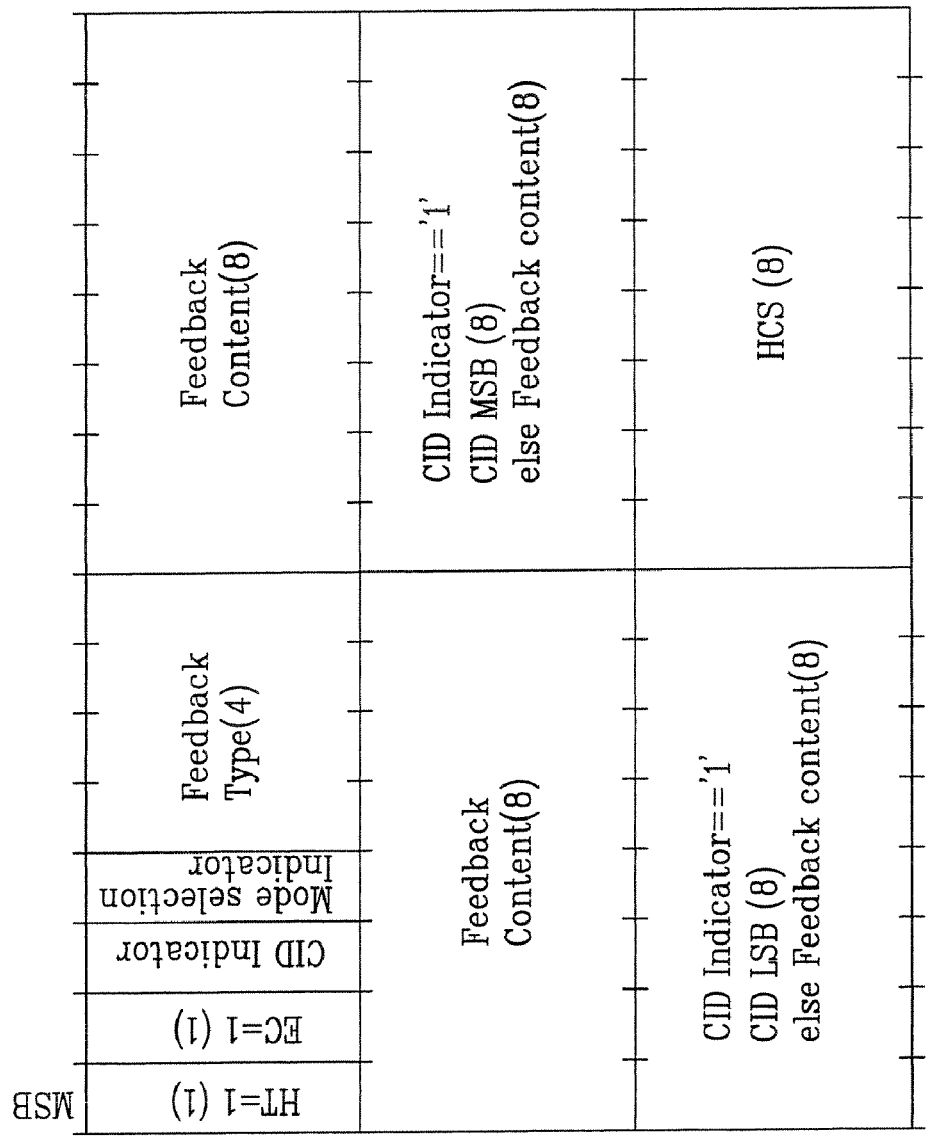
FIG. 2 illustrates is an example of a CQI feedback header.

FIG. 2 is an example of a CQI feedback header. The CQI feedback header of FIG. 2 can be used to transmit feedback information non-periodically. Moreover, the content(s) of the CQI feedback header can vary depending on the feedback type. In addition, the CQI feedback header can transmit at least two feedback values compared to transmitting only one feedback value in the related art. Accordingly, the at least two feedback values can be expressed via the feedback type. Here, the feedback type can be classified into two types. The first type relates to transmitting the feedback value periodically, and the second type relates to transmitting the feedback value non-periodically. For example, a periodic transmission of the feedback value includes an uplink transmission (UL_TX) power used by the MS for transmission and a preferred Downlink Interval Usage Code (DIUC) which is a request by the MS to the BS for a desired modulation or code rate. In addition, for example, a non-periodic transmission of feedback value includes a MIMO weight, the MIMO channel matrix H, and a downlink channel estimated value.

In retransmitting the feedback information, information related to combining a plurality of MIMO antennas into groups and transmitting these grouped antennas and information on the closed-loop MIMO are included in the feedback information.

In the header field as illustrated in FIG. 2, the Connection Identifier (CID) having '1' signifies that the CID exists in the data frame. On the contrary, if the CID is represented by '0,' 32 bits can be used to represent feedback contents instead of using the CID. At the same time, if a mode selector indicator is '1,' a most significant bit (MSB) having 6 bits from the feedback content (minimum 16 bits, maximum 32 bits) can be used, and also, the MSB can be used with different feedback values. Furthermore, a plurality of feedback values can be transmitted simultaneously via the feedback type.

Figure 3:
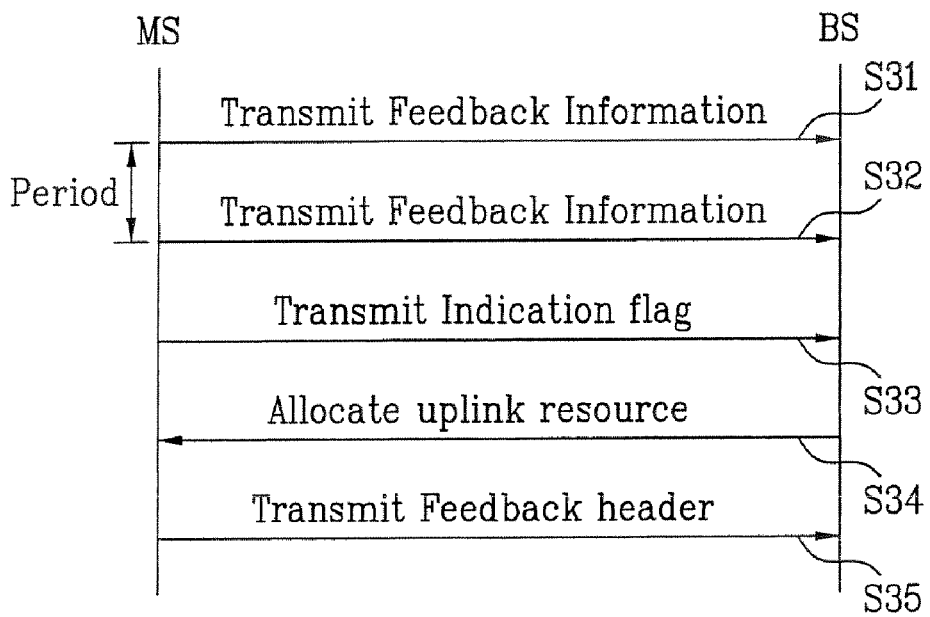
FIG. 3 is an example of an operation which illustrates receiving allocation of uplink wireless resource for non-periodically transmitting feedback information when a fast feedback channel or the CQICH is allocated to the MS.

FIG. 3 is an example of an operation which illustrates receiving allocation of uplink wireless resource for non-periodically transmitting feedback information when a fast feedback channel or the CQICH is allocated to the MS. In FIG. 3, the feedback information is transmitted to the BS periodically according to the transmission period instructed by the BS (S31, S32). With respect to the feedback header of FIG. 2, the BS does not execute periodic polling. Furthermore, in order to transmit the feedback information to the BS, the MS first determines whether the CQICH is allocated to the MS by the BS. Upon determining that the CQICH has been allocated by the BS, the MS transmits a request message to the BS requesting for an uplink resource allocation (an indication flag) to the BS (S33). The indication flag is sent on the fast feedback channel, and the indication flag is used by the MS to indicate to the BS its intention to transmit a feedback header. Moreover, the indication message is a specific encoding of the payload bits on a fast feedback channel or an enhanced fast feedback channel. In addition, the request message is an unsolicited message sent by the MS. In other words, the request message is not in response to a solicitation or an instruction message from the BS. Rather, the unsolicited message is made voluntarily by the MS based on determining the transmission channel status as well as other factors.

Thereafter, in response to the request, the MS receives the required uplink resource allocated by the BS (S34). The MS then uses the allocated uplink resource to transmit at least one feedback header which includes the feedback information (S35). The feedback header, which can be referred to as an unsolicited header since the header is sent without solicitation from the BS, does not contain a payload. As such, a protocol data unit (PDU) consists of the feedback header alone and does not contain a payload.

In transmitting the feedback header, one or more feedback headers can be transmitted to the BS via the allocated uplink resource. If a feedback type field of the feedback header indicates that there is more than one feedback type, then the feedback header includes not only a first feedback type, but also a second feedback type and any subsequent in the feedback type field. For example, if the feedback types indicated in the feedback type field relate to transmission power and channel, the feedback type relating to the transmission power is included in the header along with corresponding feedback content in the feedback content field. Moreover, with the remaining bits in the feedback type and feedback content fields, the feedback type relating to the channel is included in the header along with corresponding feedback content in the feedback content field. With such arrangement, data or contents occupying small number of bits can be included in a single header, making the transmission of the header more efficient.

Alternatively, if the feedback information destined for the BS is large and cannot be included in one unsolicited feedback header, then more than one header can be used to transmit the feedback information. Here, the feedback types in the first and the second feedback headers are identical so as to include the same feedback information. If the last feedback header of the serial feedback headers transmitting the same feedback information has available bits, it is possible to include another feedback type and feedback content in the last feedback header whose operation is described above.

To notify the BS whether the unsolicited feedback header contains more than one feedback types, the feedback type can be assigned a specific code by which the BS can decipher that the feedback header includes multiple feedback types along with corresponding feedback contents. For example, if the feedback type is indicated as '1000,' then the BS would receive the feedback header and know that the feedback header contains multiple feedback types. Any other feedback type code would indicate that the feedback header does not contain multiple feedback types. In short, the unsolicited feedback header includes at least one feedback type, regardless what the feedback type code is, and at least one feedback content that corresponds to the at least one feedback type.

In addition, if the fast feedback channel or the CQICH is allocated to a specific MS by the BS, as in the case above, the CID field does not need to be included in the header. Instead, the 1-bit resource, which is used to indicate whether the CID is included or not in the header, can be used to represent a value for the feedback content or information.

Furthermore, there could be situations where the MS does not need to requests for allocation of an uplink resource from the BS. That is, the MS can use the current uplink resource used to transmit data. Using the current uplink resource, the MS can transmit feedback information included in the unsolicited feedback header. This way, the MS would not have to receive uplink resource allocation and feedback information can be transmitted more efficiently.

Figure 4:
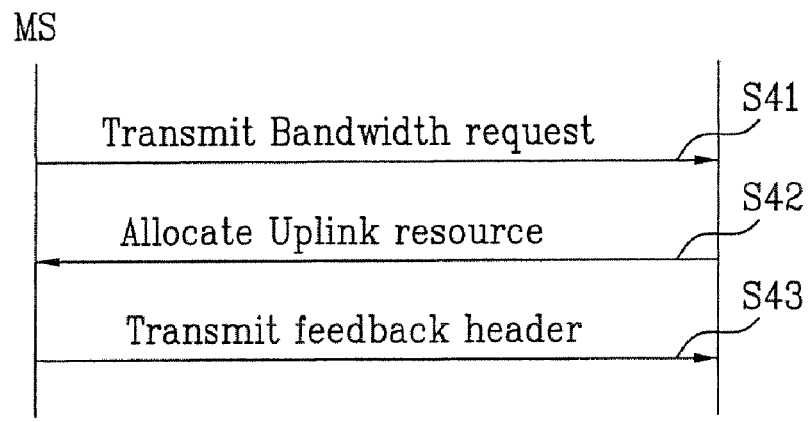
FIG. 4 is an example of an operation which illustrates receiving an uplink resource allocation for transmitting feedback information when the CQICH is not allocated.

FIG. 4 is an example of an operation which illustrates receiving an uplink resource allocation for transmitting feedback information when the CQICH is not allocated. In FIG. 4, the MS is not allocated on the fast feedback channel or the CQICH. However, the MS first determines whether the CQICH is allocated by the BS. If the MS determines that the CQICH is not allocated, the MS transmits a request message (a bandwidth request) to the BS requesting for an uplink resource allocation in order to transmit a feedback header (S41). The request message includes a bandwidth request CDMA code and a bandwidth request header. More specifically, as part of the request message, the bandwidth request CDMA code is first transmitted, and thereafter, the bandwidth request header is transmitted. In response to the request, the BS allocates the uplink resource to the MS (S42). Thereafter, the MS transmits the feedback header via the allocated uplink resource (S43).

Figure 5:
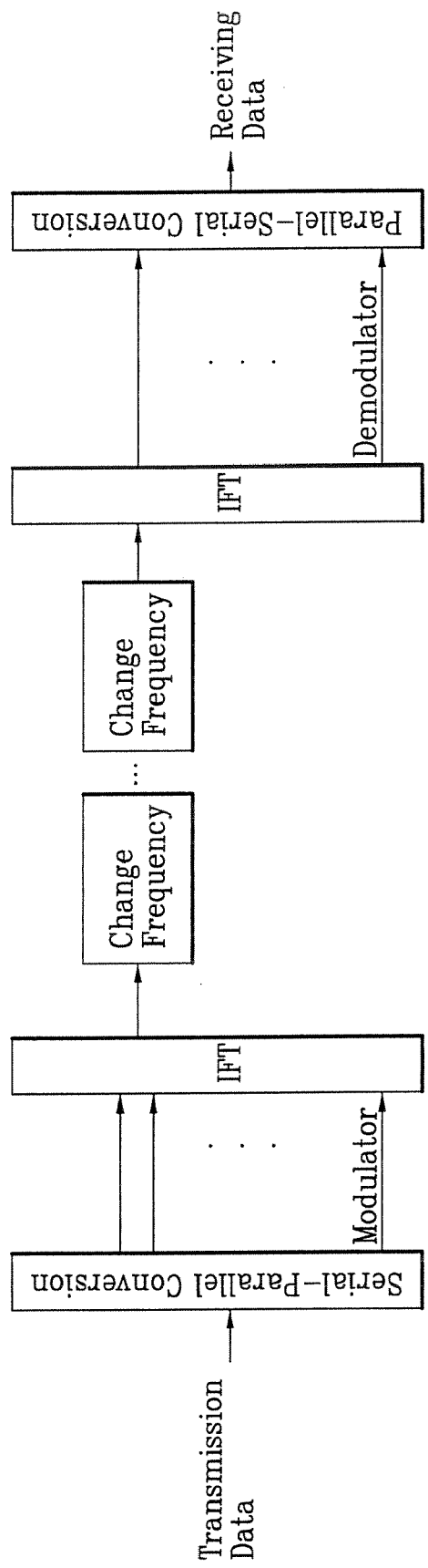
FIG. 5 illustrates an operation of the modulator/demodulator.

FIG. 5 illustrates an operation of the modulator/demodulator. As illustrated in FIG. 5, the data stream inputted in series is converted into a parallel data stream, and each parallel data stream is applied the IDFT scheme. In order to process fast data, an Inverse Fast Fourier Transform (IFFT) scheme is used. After each parallel data stream is inverse transformed correspondingly to the number of subcarriers, each transformed parallel data is then converted back into a data stream series before changing the frequency. Thereafter, the frequency changed data stream is transmitted to the receiving end which then demodulates the received signal using the inverse operation from that of the transmitting end.

In the OFDM or OFDMA wireless communication system of the related art, a base station (BS) receives from a mobile station (MS) a determined value of the downlink channel status via a fast feedback channel, and in case of the MIMO system, the BS receives an antenna weight value from the MS. In addition, the BS receives the MS selected MIMO mode as well as the permutation mode selected by the MS.

In recent years, the MIMO system has been receiving much recognition in the mobile communication system requiring fast data transmission for improving frequency efficiency and the network link storage by using each of the plurality of antennas of the BS and the MS. In the MIMO system, the BS transmits data via a plurality of antennas to the MS. Upon receipt of the transmitted data, the MS estimates the channel information of each channel used by the BS to transmit data, determines the weight value(s) using each estimated channel information, and feeds back or transmits to the BS the determined weight values. By applying the transmitted weight values to the inputted data, the BS can then more accurately transmit the data to the MS. In the MIMO system, based on the data transmission method employed by the plurality of the antennas of the transmitting end, the MIMO mode can be classified into various modes, including a Space-Time Transmit Diversity (STTD), Spatial Multiplexing (SM), and a closed-loop SM.

At the same time, the MS in the OFDM or the OFDMA wireless communication system determines a permutation mode to be used for transmitting in the downlink direction and then transmits (or feeds back) the determined permutation mode to the BS as feedback information. Here, determining the permutation mode refers to determining data allocation and arrangement on a frequency bandwidth for data transmission. That is, the permutation mode refers to selecting any one of a Full Usage Subcarrier (FUSC), which uses all the subcarriers in the bandwidth to achieve diversity, a Partial Usage Subcarrier (PUSC), which uses a specified amount of subcarriers to achieve diversity, and an Adjacent Subcarrier Permutation (ASCP), which uses a specified amount of subcarriers adjacent to each other.

There are various methods available for transmitting as feedback information the MIMO mode and the permutation mode selected by the MS. For example, the MS selected MIMO mode and permutation mode can be transmitted periodically by using an Information Element (IE), which provides a Channel Quality Information Channel (CQICH). Alternatively, the MIMO mode and the permutation mode can be transmitted during a polling operation of the BS by using a fast feedback allocation subheader, which is transmitted along with data from the MS. Furthermore, if the MS receives the CQICH allocation from the BS and selects the MIMO mode and/or the permutation mode to include in the feedback information, the CQICH is used to transmit an indication flag while a mode selection feedback header is used to transmit the MIMO mode and/or the permutation mode. The mode selection feedback header is used when the MIMO mode and/or the permutation mode is not fed back frequently or is fed back non-periodically.

Figure 6:
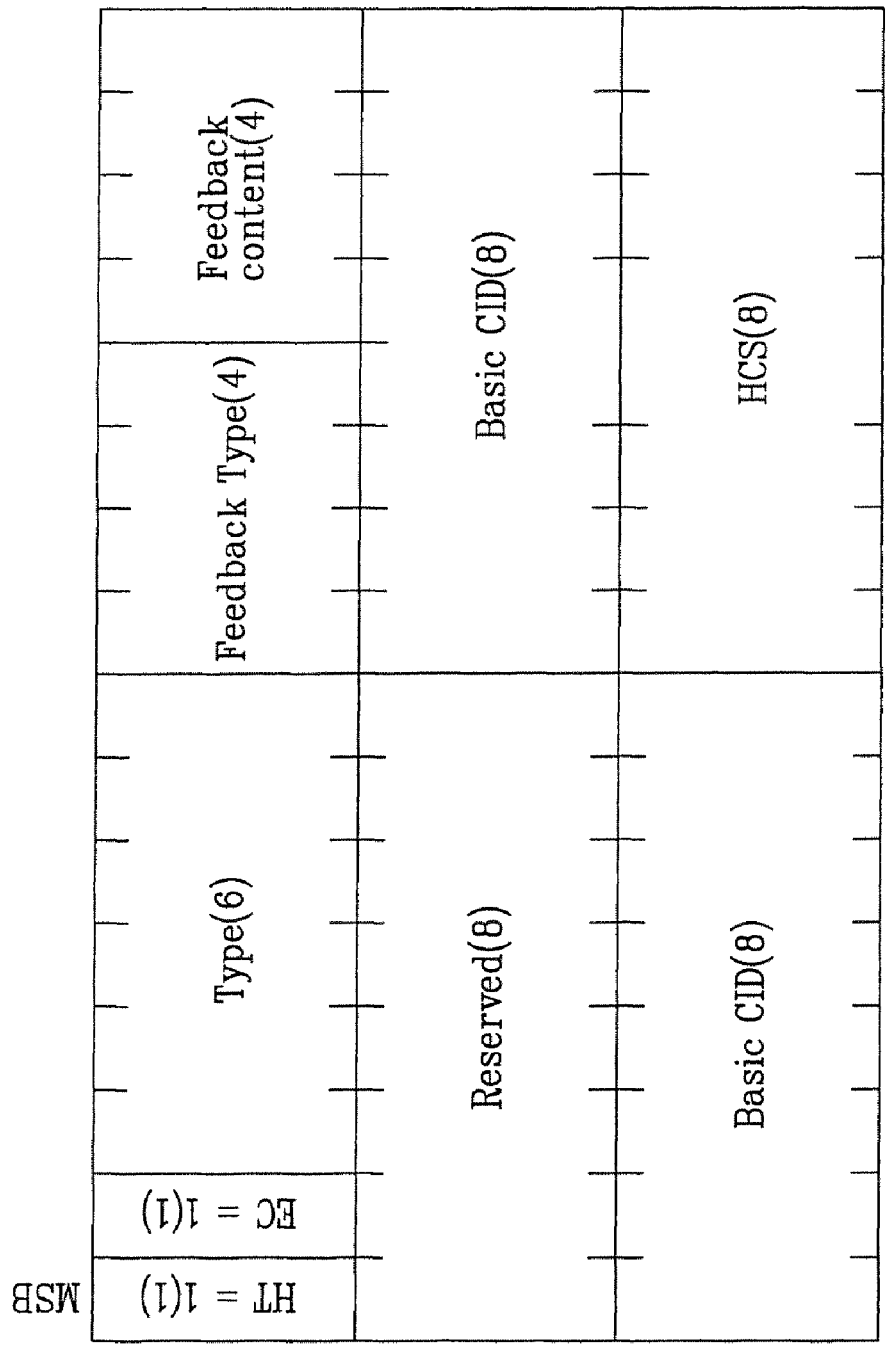
FIG. 6 illustrates a structure of a mode selection feedback header. The mode selection feedback header is transmitted by itself and is not accompanied by a data portion.

FIG. 6 illustrates a structure of a mode selection feedback header. The mode selection feedback header is transmitted by itself and is not accompanied by a data portion. In FIG. 6, the "Feedback Type" field provides that either the MIMO mode or the permutation mode has been selected, and the "Feedback Content" provides a value of a feedback payload. Here, the feedback payload value refers to indications of the MS selected MIMO mode and the permutation mode.

A detailed information or content of the feedback information from the MS to the BS is transmitted via the feedback payload. The feedback payload can be comprised of at least two bits, such as 4 bits, 5 bits, or 6 bits. Furthermore, the MS selected MIMO mode and the permutation mode are mapped on each feedback payload, as indicated by Tables 1, 2, and 3. The BS decodes the values received from the BS via the feedback payload and learns of the MS selected MIMO mode and the permutation mode, and thereafter, transmits the data during the subsequent data frame.

TABLE 1

| Payload | Content |
| --- | --- |
| 0b0000 | STTD and PUSC/FUSC permutation |
| 0b0001 | STTD and adjacent subcarrier permutation |
| 0b0010 | SM and PUSC/FUSC permutation |
| 0b0011 | SM and adjacent subcarrier permutation |
| 0b0100 | Closed-loop SM and PUSC/FUSC permutation |
| 0b0101 | Closed-loop SM and adjacent subcarrier permutation |
| 0b0110 | Closed-loop SM + Beamforming and adjacent subcarrier permutation |
| 0b1000~0b1111 | Reserved |

TABLE 2

| Payload | Content |
| --- | --- |
| 0b00100 | Hybrid and PUSC/FUSC permutation |
| 0b00101 | Hybrid and adjacent subcarrier permutation |
| 0b00110 | Beamforming and adjacent subcarrier permutation |
| 0b00111 | Closed-loop SM and PUSC/FUSC permutation |
| 0b01000 | Closed-loop SM and adjacent subcarrier permutation |
| 0b1000~0b1111 | Reserved |

TABLE 3

| Payload | Content |
| --- | --- |
| 0b101100 | Closed-loop SM and PUSC/FUSC permutation |
| 0b101101 | Closed-loop SM and adjacent subcarrier permutation |
| 0b101110 | Hybrid and PUSC/FUSC permutation |
| 0b101111 | Hybrid and adjacent subcarrier permutation |
| 0b110000 | Beamforming and adjacent subcarrier permutation |
| 0b110001 | Antenna Group A. For 3-antenna BS, 00 = Antenna group 0, 1 & 0, 2. For 4-antenna BS, 00 = Antenna group 0, 1 & 2, 3 |
| 0b110001 | Antenna Group B. For 3-antenna BS, 00 = Antenna group 0, 1 & 1, 2. For 4-antenna BS, 00 = Antenna group 0, 2 & 1, 3 |
| 0b110011 | Antenna Group C. For 3-antenna BS, 00 = Antenna group 0, 1 & 0, 2. For 4-antenna BS, 00 = Antenna group 0, 3 & 1, 2 |
| 0b1000~0b1111 | Reserved |

The contents of Tables 2 and 3 are relatively recent and have recently been added. As such, the MS selected MIMO mode and the permutation mode can be mapped to the 5-bit feedback payload and the 6-bit feedback payload, respectively.

According to the conventional art, the mode selection feedback header is structured to include only the 4-bit feedback payload. Therefore, the newly introduced 5-bit feedback payload or the 6-bit feedback payload cannot be included. Consequently, the contents (or information) of the MIMO mode and the permutation matrix mapped in the 5-bit and 6-bit feedback payloads cannot be transmitted as feedback to the BS.

Figure 7:
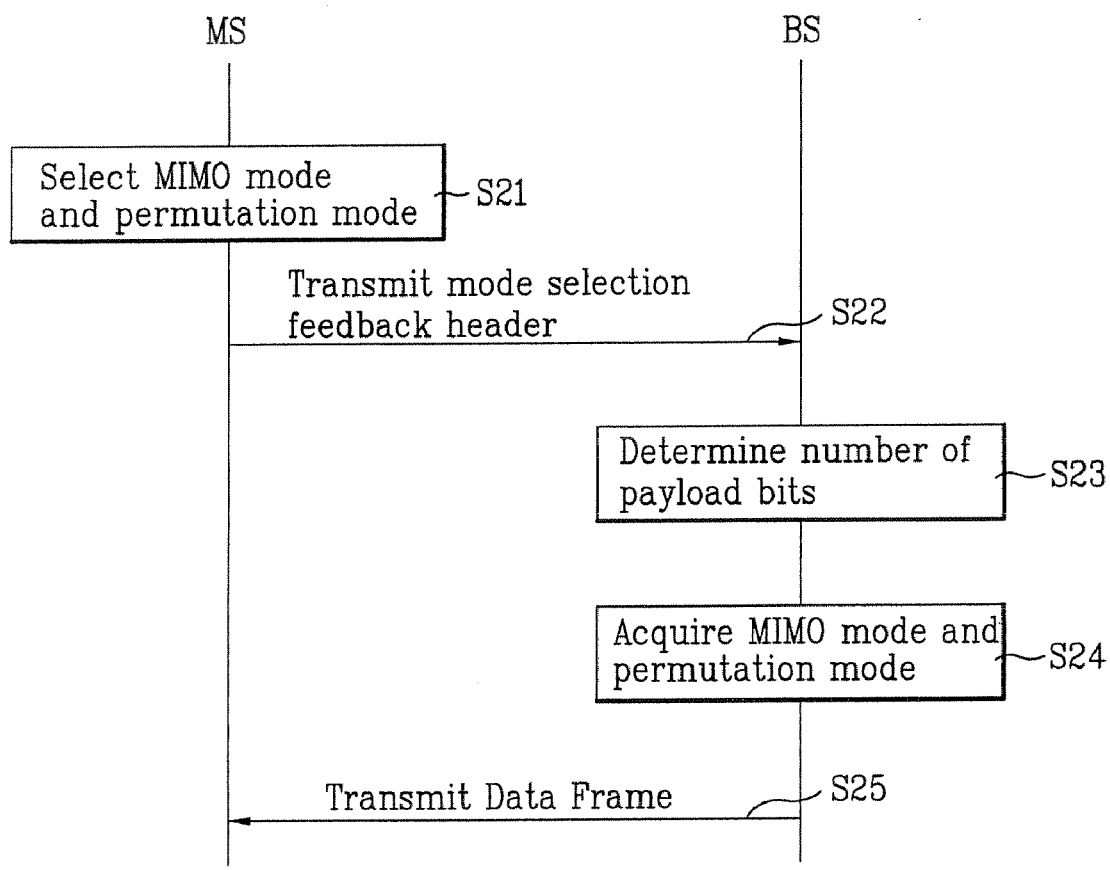
FIG. 7 is an example illustrating an operation of the present invention.

FIG. 7 is an example illustrating an operation of the present invention. In FIG. 7, the MS selects the MIMO mode and the permutation mode (S21). When the MS makes the selection, the MS can select the contents of any one of the Table 1-Table 3.

Figure 8:
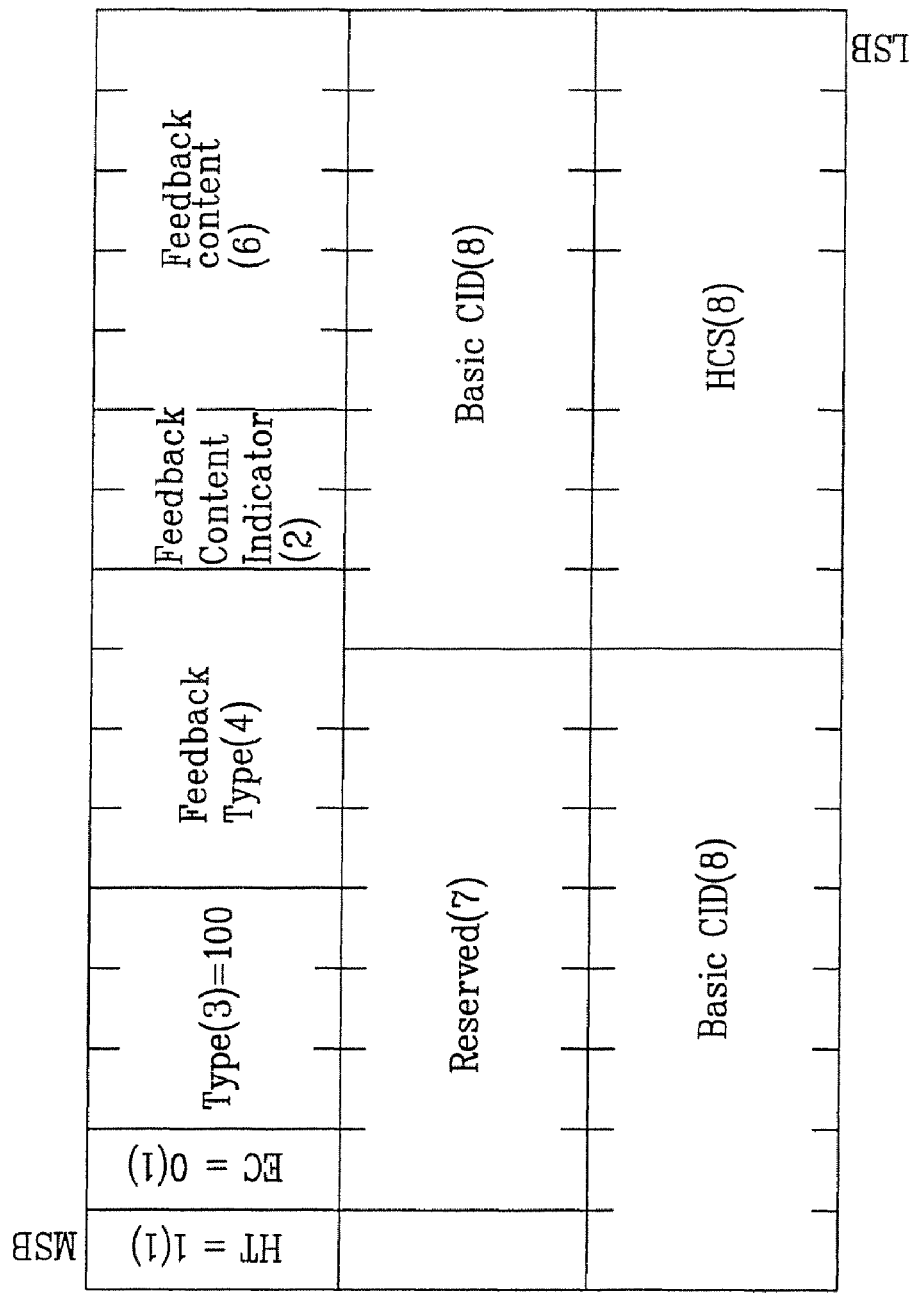
FIG. 8 illustrates an example of a mode selection feedback header.

After the MS selects the MIMO mode and the permutation mode, the MS includes the feedback payload mapped by the MIMO mode and the permutation mode in the mode selection feedback header, and then transmits the feedback header to the BS (S22). FIG. 8 illustrates an example of a mode selection feedback header. Compared to the conventional mode selection feedback header, the mode selection feedback header of FIG. 7 includes a "Feedback Content Indicator" field, and a capability to accommodate larger data bits (or number of feedback payload bits), i.e., 6 bits, in a "Feedback Content" field.

The Feedback Content Indicator field is used to indicate the number of bits of the feedback payload, which is included in the Feedback Content field. In other words, different from the conventional art, the Feedback Content Indicator field is provided or added to support a 5-bit or a 6-bit MIMO mode and the permutation mode which cannot be selected using a 4-bit feedback payload. For example, '00' represents 4 bits, '01' represents 5 bits, '10' represents 6 bits, and '11' is 'reserved.'

After the mode selection feedback header is received by the BS, the BS then determines the number of bits for the feedback payload based on the Feedback Content Indicator field included in the mode selection feedback header (S23). As stated above, the feedback payload is included in the Feedback Content field. Furthermore, the BS determines the MIMO mode and the permutation mode from the Feedback Content field based on the determined number of feedback payload bits (S24).

For example, if the Feedback Content Indicator is represented by '01;' the number of bits for the feedback payload included in the Feedback Content is 5 bits. Moreover, if the content of the Feedback Content field is '11000,' as indicated in Table 2, the MS selected MIMO mode and the permutation mode are 'Closed-loop SM and adjacent subcarrier (AMC) permutation.'

In another example, if the Feedback Content Indicator is represented by '10,' the number of bits for feedback payload included in the Feedback Content is 6 bits. Moreover, if the content of the Feedback Content field is '110000,' as indicated in Table 3, the MS selected MIMO mode and the permutation mode are 'Beamforming and adjacent subcarrier permutation.'

Thereafter, the BS applies the MS determined MIMO mode and the permutation matrix in the subsequent data frame and transmits the data.

In another embodiment of the present invention, a fast feedback allocation subheader can be used by the BS to transmit a request to the MS to provide the feedback value. Moreover, the fast feedback allocation subheader can also be used to allocate the uplink resource to be used by the MS. Table 4 shows a data format of the fast feedback allocation subheader.

TABLE 4

| Syntax | Size | Notes |
|---|---|---|
| FAST FEEDBACK allocation subheader{ | | |
| Allocation offset | 6 bits | |
| Feedback type | 2 bits | 00 - Fast DL measurement |
| | | 01 - Fast MIMO feedback, antenna #0 |
| | | 10 - Fast MIMO feedback, antenna #1 |
| | | 11 - MIMO mode and permutation mode feedback |
| } | | |

Referring to Table 4, the 'allocation offset' field is a value from the MS, which received the fast feedback allocation subheader from the BS, allocating the location of the slot for transmitting feedback information according to the request by the BS. According to the related art, the MS transmits the BS requested feedback value using the slot designated by the 'allocation offset' via the CQICH.

The 'feedback type' field is an allocated value which represents feedback information the BS wants to receive from the MS. More specifically, the BS can allocate the following values to the MS. For example, the allocated value can be a downlink channel estimated value Feedback type='00'), a weight value of antenna #0 when there are two antennas (i.e., Feedback type='01'), a weight value of antenna #1 when there are two antennas (i.e., Feedback type='10'), and change in a MIMO mode or a permutation mode (i.e., Feedback type='11'). Furthermore, the BS can allocate an uplink resource in case the MS wants to change the MIMO mode or the permutation mode. Preferably, such an uplink resource allocation is applied to the uplink portion of the subsequent frame.

However, transmitting feedback information using the fast feedback allocation subheader is not without flaws. First, the amount of information that can be transmitted in the feedback information using the fast feedback allocation subheader is limited. Second, the amount of information that can be received as feedback information is limited since the feedback information is transmitted via an allocated specified slot in the fast feedback channel. Lastly, when the MS wants to change the MIMO mode or the permutation mode, the BS applies the allocated uplink resource only to the uplink portion of the subsequent frame. As such, the MS can miss the opportunity to transmit the feedback information until the subsequent frame, causing inefficiency.

In order to deal with problems associated with the fast feedback allocation subheader, the BS transmits a feedback request message to the MS. In another embodiment of the present invention, the feedback request message can be in a form of an Enhanced Fast-Feedback Allocation Type (EFAT) or a feedback header (FS). By comprising the feedback request message with the EFAT or the FS subheader formats, there can be at least two feedback methods by which the information is fed back to the BS from each formats, and at the same time, the types of information received via the feedback information can be increased from each formats. In addition, a method of notifying the existence of the EFAT subheader or the FS by using the Medium Access Channel (MAC) header can be used to comply with the related art.

FIG. 9 illustrates examples of a data structure of a MAC Protocol Data Unit (PDU). In FIG. 9, the MAC header is located in the front of the MAC PDU, and the EFAT subheader and the FS header are located in the end of the respective MAC PDU.

Figure 10:
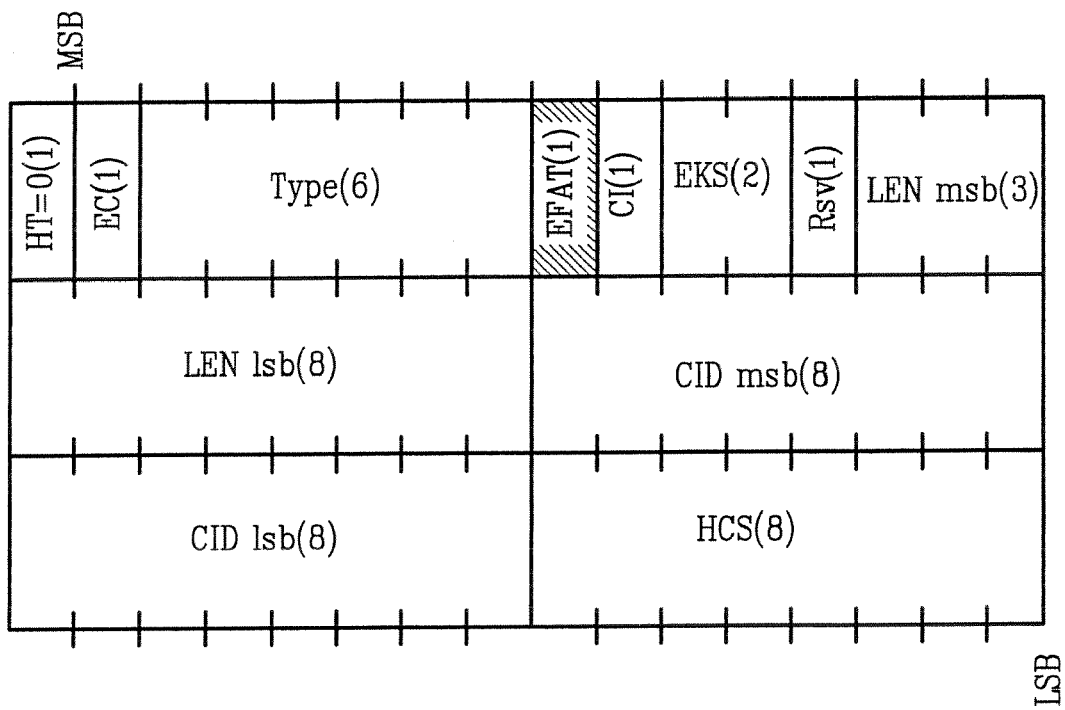
FIG. 10 are examples illustrating structural components of a MAC header.
Figure 10:
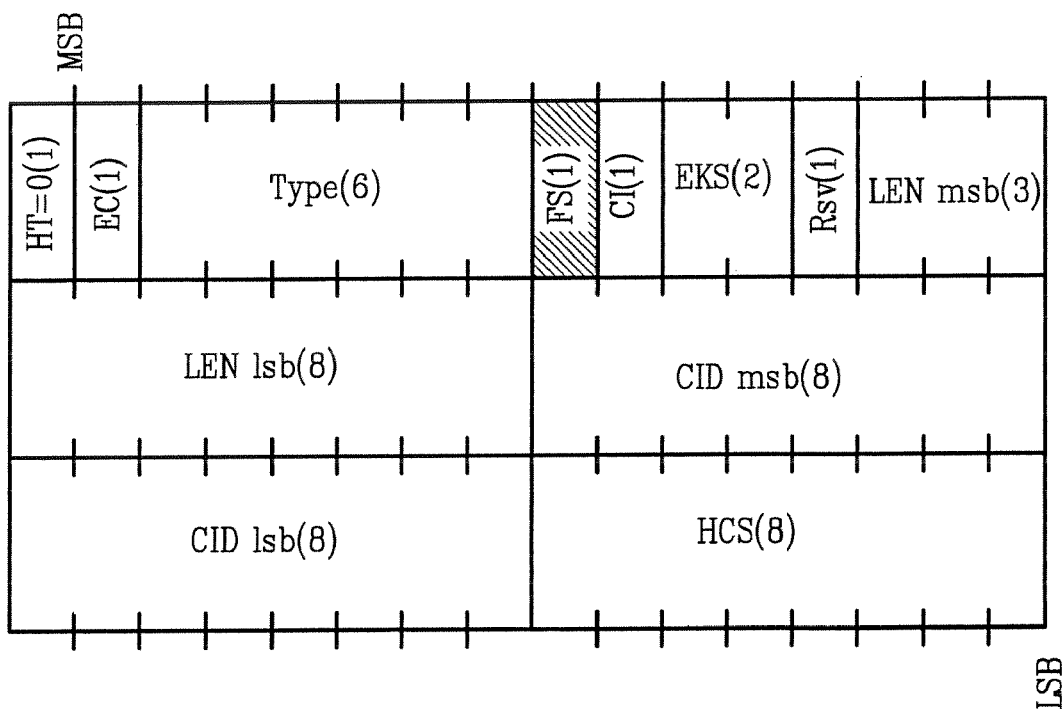

FIG. 10 are examples illustrating structural components of a MAC header. It is preferable to indicate through the MAC header that the EFAT subheader or the FS are included at the end of the MAC PDU. As described above, the MAC header 'type' can be used to provide whether other types of subheaders are available. However, in FIG. 10, the respective 'reserved' field representing 1 bit of the related art can be used as an indicator to notify the existence of the EFAT subheader or the FS header, respectively.

Figure 11:
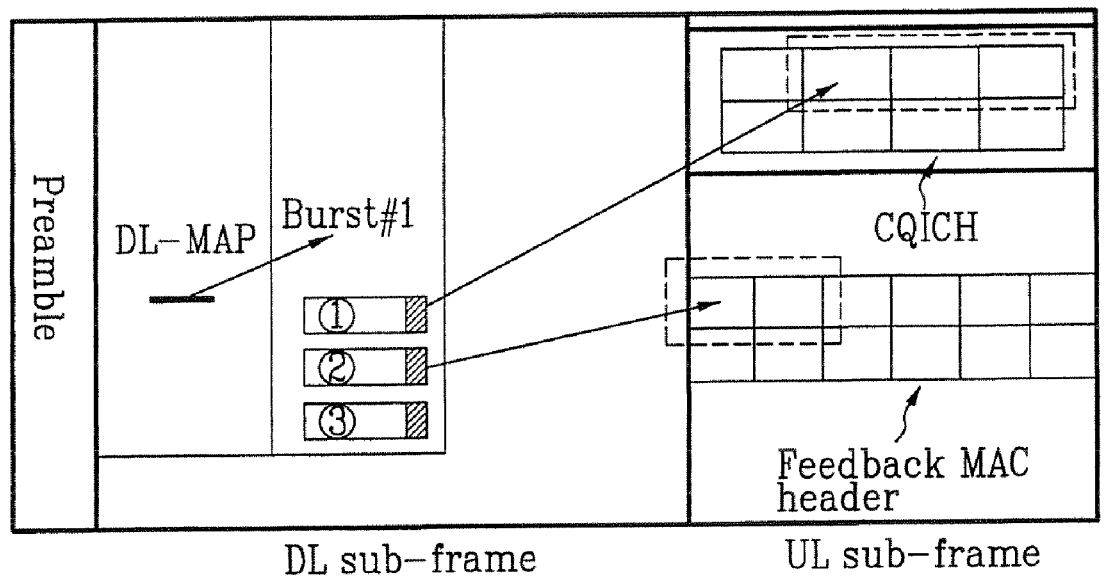
FIG. 11 is an example illustrating a data frame in the physical layer.

FIG. 11 is an example illustrating a data frame in the physical layer. In FIG. 11, the BS uses a DL-AP Information Element (IE) of the DL-MAP to transmit information on the location and size of the burst, which is allocated to the MS by the BS. The burst is comprised of a plurality of data packets and each data packet includes the MAC header and a subheader. Preferably, the BS attaches the EFAT subheader at the end of the data packet when making a feedback request of specific information from the MS.

Table 5 is an example showing a data format of the EFAT subheader.

TABLE 5

| Syntax | Size (bits) | Notes |
|---|---|---|
| Enhanced Fast-Feedback Allocation Subheader{ | | |
|   Allocation type | 1 | 0 = Use Fast Feedback channel (CQICH)<br>1 = Use Feedback MAC header |
|   If allocation type = 0{ | | |
|     Allocation offset | 6 | |
|     CQICH_num | 4 | |
|     Feedback type | 3 | |
|     Frame offset | 2 | |
|   }else{ | | |
|     UIUC | 4 | |
|     Duration | 4 | |
|     Feedback type | 4 | |
|     Frame offset | 3 | |
| } | | |

Table 6 is an example showing a data format of the Feedback Subheader.

TABLE 6

| Syntax | Size (bits) | Notes |
|---|---|---|
| Feedback Subheader{ | | |
|   Allocation type | 1 | 0 = Use Fast Feedback channel (CQICH)<br>1 = Use Feedback MAC header |
|   If allocation type = 0{ | | |
|     Allocation offset | 6 | |
|     CQICH_num | 4 | |
|     Feedback type | 3 | |
|     Frame offset | 2 | |
|   }else{ | | |
|     UIUC | 4 | |
|     Duration | 4 | |
|     Feedback type | 4 | |
|     Frame offset | 3 | |
| } | | |

The 'Allocation type' field of Table 5 and Table 6 is an indicator which indicates a method of transmitting as feedback a specific information request from the BS. Preferably, the specific information request from the BS is not limited to one feedback method but includes at least two feedback methods from which the BS can select and order any one of the feedback methods based on the channel status. For example, if there are two feedback methods by which to transmit feedback information, the first feedback method can include transmitting the feedback information via the CQICH and the second feedback method can include using the feedback MAC header. From these two feedback methods, the BS selects either the first feedback method or the second feedback method and orders the MS to transmit according to the selected feedback method. Here, the feedback methods are not limited to the examples of above but can includes other feedback methods.

The 'Allocation offset' field is an indicator which indicates a location of the slot for the MS to use in transmitting feedback information if the BS has selected to transmit feedback information via the CQICH as the feedback method. In detail, the offset value is determined from the starting point of the CQICH. Moreover, 'CQICH_num' represents a number of CQICH slots that can be used by the MS to feed back specific information requested by the BS.

The 'Duration' field of Table 5 and Table 6 is an indicator which indicates a length of the symbol that can be used by the MS to feed back information if the BS has selected to transmit feedback information using the feedback MAC header as the feedback method. Preferably, a plurality of symbols can be used to feed back information and not limited to one symbol.

The 'Frame offset' field is an indicator which indicates a location of the starting time to begin feedback transmission, and includes an offset value based on the current frame which includes the EFAT subheader. Preferably, the MS selects the starting data frame to begin transmission of feedback information, and not be bound to transmitting feedback information in the subsequent data frame after receiving the feedback information request message from the BS.

The 'Feedback type' field in an indicator which indicates specific information the BS wishes to receive as feedback information. If the BS has selected to transmit feedback information via the CQICH as the feedback method, and there is a plurality of downlink channel status estimated values and antennas, the MS can provide information pertaining to a weight value of each antenna and changes in the MIMO mode and/or the permutation mode. At the same time, if the BS has selected to transmit feedback information using the feedback MAC header as the feedback method, various information, as shown in Table 7, can be provided. Furthermore, the BS can provide the 'Feedback type' field in a bitmap format, and at the same time, allocates uplink resources in order to receive a plurality of feedback values.

TABLE 7

| Feedback type | Feedback contents | Description |
|---|---|---|
| 0b0000 | Set as described in Table 296d | MIMO mode and permutation feedback |
| 0b0001 | DL average CQI (5 bits) | 5 bits CQI feedback |
| 0b0010 | Number of index L (2 bits) + L occurrences of Antenna index (2 bits) + MIMO coefficients (5 bits 8, 4, 5, 4, 10, 6) | MIMO coefficients feedback |
| 0b0011 | Preferred-DIUC (4 bits) | Preferred DL channel DIUC feedback |
| 0b0100 | UL-TX-Power (7 bits) | UL transmission power |
| 0b0101 | Preferred DIUC (4 bits) + UL-TX-Power (7 bits) + UL-headroom (6 bits) + CQI (5 bits) | PHY channel feedback |
| 0b0110 | Number of bands N (2 bits) + N occurrences of 'band index (6 bits) + CQI (5 bits)' | CQIs of multiple AMC bands |

TABLE 7-continued

| Feedback type | Feedback contents | Description |
|---|---|---|
| 0b0011 | Number of feedback types 0 (2 bits) + 0 occurrences of feedback type (4 bits) + feedback content (variable) | Multiple types of feedback |
| 0b1000~0b1111 | reserved | |

Table 8 shows a preferred data format of the FS. In Table 8, as in Table 6, the BS commands the MS to use the feedback MAC header to feed back information, and does not provide the MS to select one of either the CQICH feedback method or the feedback MAC header feedback method.

TABLE 9

| Syntax | Size (bits) | Notes |
|---|---|---|
| Feedback subheader{ | | |
| UIUC | 4 | |
| Feedback type | 4 | |
| Allocation offset | 6 | |
| Slot_num | 1 | In the OFDMA slot |
| Frame offset (F) | 1 | |
| } | | |

In Table 8, the 'UIUC' field includes coding and modulation information for the MS to use to transmit information, and the 'Feedback type' field is an indicator which indicates specific information the BS wants to receive from the MS. In addition, the "Allocation offset' field is an indicator which assigns a location of the slot for the MS to use to transmit feedback information. Preferably, the starting point of the offset value should be determined by counting the slots from last slot of the corresponding data frame to assign the location. The 'Slot-num' field is an indicator which indicates a number of slots that can be used to by the MS for feeding back information to the BS. Here, a maximum of four slots can be allocated, and if a Quadrature Phase Shift Keying (QPSK) is ½, a maximum of 192 bits (48 bits*4 slots) can be used for transmission, and since the FS has maximum of 6 bits, up to four slots can be assigned. The 'Frame offset' field is an indicator which allocates the starting time location of the specific feedback information. The offset value is determined from the current data frame which includes the FS.

Figure 12:
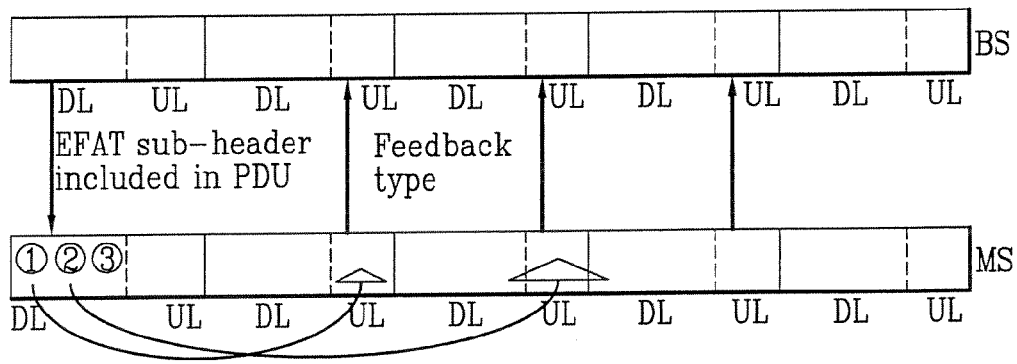
FIG. 12 are examples illustrating a feedback operation of the 'Feedback type'.

FIG. 12 are examples illustrating a feedback operation of the 'Feedback type.' In FIG. 12, the data burst, allocated to the MS, includes three MAC PDUs (①, ②, ③), which includes the EFAT subheader and the FS subheader, respectively.

The first MAC PDU (①) represents a feedback method indicated by the 'Allocation type' field which transmits feedback information via the CQICH. Here, for example, 'Allocation offset' is set to '1,' 'Frame offset' is set to '0' and 'CQICH_num' is set to '3.' Accordingly, in FIG. 13, the MS uses three slots on the CQICH, which were allocated for feeding back information in the subsequent data frame and not in the current frame comprising the MAC PDU, to feed back the specific information requested by the BS.

The second MAC PDU (②) represents a feedback method indicated by the 'Allocation type' field which transmits feedback information using the feedback MAC header. Here, for example, 'Duration' is set to '1,' and 'Frame offset' is set to '1.' Accordingly, in FIG. 13, the MS uses two slots in the feedback MAC header, which were allocated for feeding back information in the subsequent data frame and not in the current frame comprising the MAC PDU, to feed back the specific information requested by the BS. The feedback MAC header allocation, as is the case with uplink data burst allocation, can be achieved by providing the wireless resources for feedback information using 'Duration' of Table 5.

Figure 13:
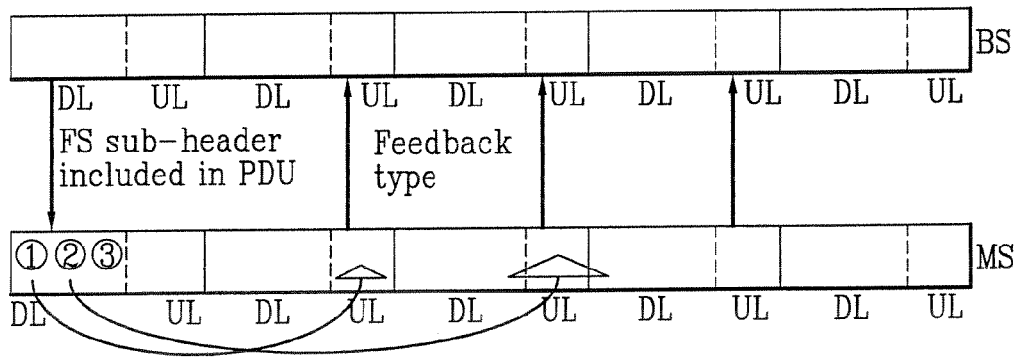
FIG. 13 is an example illustrating components of the feedback MAC header.

FIG. 13 is an example illustrating components of the feedback MAC header. In FIG. 14, the feedback MAC header is a header which feeds back the feedback information expressed in Table 6. Preferably, the MS can use 'Feedback content' of the feedback MAC header representing 16 bits to feed back a large volume of BS desired feedback information.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting feedback information at a mobile subscriber station (MSS) in a broadband wireless access system, the method comprising:
    transmitting an indication flag to a base station to request allocation of uplink radio resources for transmission of feedback information, when the mobile subscriber station (MSS) needs to transmit the feedback information as an unsolicited feedback; and
    transmitting the feedback information to the base station on the uplink radio resources allocated by the base station, wherein the feedback information is transmitted to the base station with being included in a feedback header which does not contain a payload;
    wherein the feedback header comprises a feedback type field, a feedback content field, and an HCS field.

2. The method of claim 1, wherein the feedback header either contains or does not contain a connection identifier (CID) in accordance with a connection identifier indicator (CII) included in the feedback header.

3. The method of claim 2, wherein, if the connection identifier indicator (CII) indicates that the feedback header does not contain the connection identifier (CID), a connection identifier (CID) field of the feedback header is used as a feedback content field.

4. A method of receiving feedback information at a base station in a broadband wireless access system, the method comprising:
    receiving an indication flag for requesting allocation of radio resources from a mobile subscriber station (MSS);
    allocating uplink radio resources to the mobile subscriber station (MSS) for transmitting feedback information; and receiving the feedback information from the mobile subscriber station (MSS) on the allocated uplink radio resources as an unsolicited feedback,
    wherein the feedback information is received with being included in a feedback header which does not contain a payload;

wherein the feedback header comprises a feedback type field, a feedback content field, and an HCS field.

5. The method of claim 4, wherein the feedback header either contains or does not contain a connection identifier (CID) in accordance with a connection identifier indicator (CII) included in the feedback header.

6. The method of claim 5, wherein, if the connection identifier indicator (CII) indicates that the feedback header does not contain the connection identifier (CID), a connection identifier (CID) field of the feedback header is used as a feedback content field.

7. A mobile subscriber station (MSS) for transmitting feedback information in a broadband wireless access system, the mobile subscriber station (MSS) comprising:

means for transmitting an indication flag to a base station to request allocation of uplink radio resources for transmission of feedback information, when the mobile subscriber station (MSS) needs to transmit the feedback information as an unsolicited feedback; and means for transmitting the feedback information to the base station on the uplink radio resources allocated by the base station, wherein the feedback information is transmitted to the base station with being included in a feedback header which does not contain a payload;

wherein the feedback header comprises a feedback type field, a feedback content field, and an HCS field.

* * * * *